(12) United States Patent
Tripp et al.

(10) Patent No.: US 7,373,553 B2
(45) Date of Patent: May 13, 2008

(54) COMPUTER SUPPORT NETWORK WITH CUSTOMER PORTAL TO MONITOR INCIDENT-HANDLING STATUS BY VENDOR'S COMPUTER SERVICE SYSTEM

(75) Inventors: Travis Scott Tripp, Fort Collins, CO (US); Philip A. Flocken, Denver, CO (US); William Brothers, Rocklin, CA (US); Joshua D. Hawkins, Fort Collins, CO (US); Noreen K. Lee, Roseville, CA (US); Jay Shaughnessy, Cherry Hill, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 10/984,720

(22) Filed: Nov. 8, 2004

(65) Prior Publication Data

US 2005/0198556 A1 Sep. 8, 2005

Related U.S. Application Data

(63) Continuation-in-part of application No. 10/442,592, filed on May 21, 2003.

(60) Provisional application No. 60/518,365, filed on Nov. 8, 2003.

(51) Int. Cl.
*G06F 11/00* (2006.01)

(52) U.S. Cl. .......................................... 714/37; 714/46

(58) Field of Classification Search .................. 714/25, 714/44, 46
See application file for complete search history.

(56) References Cited

U.S. PATENT DOCUMENTS

| 5,678,002 | A | * | 10/1997 | Fawcett et al. ............. 715/709 |
| 6,230,287 | B1 | * | 5/2001 | Pinard et al. .................. 714/31 |
| 6,237,114 | B1 | * | 5/2001 | Wookey et al. ............... 714/47 |
| 6,260,048 | B1 | * | 7/2001 | Carpenter et al. ........ 707/104.1 |
| 6,480,972 | B1 | * | 11/2002 | Cromer et al. ................ 714/25 |
| 6,516,427 | B1 | * | 2/2003 | Keyes et al. .................. 714/25 |
| 6,539,499 | B1 | * | 3/2003 | Stedman et al. .............. 714/40 |
| 6,658,586 | B1 | * | 12/2003 | Levi .............................. 714/4 |
| 6,865,691 | B1 | * | 3/2005 | Brundridge et al. .......... 714/25 |
| 2003/0009710 | A1 | * | 1/2003 | Grant .......................... 714/37 |
| 2004/0090450 | A1 | * | 5/2004 | Gill et a. ..................... 345/709 |
| 2004/0123153 | A1 | * | 6/2004 | Wright et al. ............... 713/201 |
| 2004/0123188 | A1 | * | 6/2004 | Srinivasan et al. ........... 714/44 |
| 2004/0128585 | A1 | * | 7/2004 | Hind et al. ................... 714/38 |
| 2004/0153764 | A1 | * | 8/2004 | Paradkar ...................... 714/18 |
| 2004/0236843 | A1 | * | 11/2004 | Wing et al. ................. 709/219 |

FOREIGN PATENT DOCUMENTS

EP 1195681 A2 * 4/2002

* cited by examiner

*Primary Examiner*—Scott Baderman
*Assistant Examiner*—Loan Truong (57) ABSTRACT

Customer support personnel can access via a vendor's portal an automated support vendor website to view the status of a fault incident that is being handled by the vendor's automated support system. In an illustrated embodiment, the customer can actually alter the status of the fault incident while it is being handled on the vendor's site.

4 Claims, 6 Drawing Sheets

COMPUTER SUPPORT NETWORK WITH CUSTOMER PORTAL TO MONITOR INCIDENT-HANDLING STATUS BY VENDOR'S COMPUTER SERVICE SYSTEM

This application is a continuation-in-part of copending U.S. patent application Ser. No. 10/442,592, filed May 21, 2003, and further benefits from the filing data for U.S. Provisional Patent Application No. 60/518,365 filed Nov. 8, 2003. These applications are incorporated in their entireties herein by reference.

BACKGROUND OF THE INVENTION

The present invention relates to computer systems and, more particularly, to a method for a vendor to service a client computer. The invention provides for economical and effective automated and semi-automated servicing of client computers. Below, related art is discussed to aid in the understanding of the invention. Related art labeled as "prior art" is admitted prior art; related art not labeled "prior art" is not admitted prior art.

Much of modern progress is associated with computers, which are basically "hardware" machines that manipulate data in accordance with "software" programs of instructions. Software programs are generally quite complex: in part because of their intended functionality, and in part due to a requirement to run on a variety of hardware configurations and along with a variety of other software programs. Due to the complexity, software faults are not uncommon. Due to society's increasing dependence on computers, such faults are a significant concern.

Faults can be addressed on several levels. In some cases, faults can be handled automatically by the computer on which the fault occurred. In other cases, the user can act to address the fault or work interactively with the computer to address the fault, e.g., using a software "wizard". In organization, support personnel can be alerted to address the fault. Also, if the computer on which the fault occurred is "managed" by other computers, these can automatically or with human help address some faults. Finally, the fault can be handled by computer support vendors, e.g., hardware or software manufacturers or third-party support vendors. In this case, the support can be automated or involve human support (e.g., over the phone or email or on-site.).

Hewlett-Packard Company has developed a "self-healing" system in which software located at a service vendor site responds to faults on customer computers, as described in U.S. patent application Ser. No. 10/442,592. When a fault occurs on a customer computer, client software running on that computer automatically gathers diagnostic data and communicates it to the vendor's system. The vendor's system analyzing the fault data using up-to-date information and provides a solution to the customer in the form of documents from a continually updated knowledge base. The vendor ensures that the solution is the best available, while the diagnostic-data gathering client software ensures accurate diagnostic data without burdening the user/customer. Faults that are not effectively addressed by the automated system can be referred to human support personnel.

SUMMARY OF THE INVENTION

In the course of the present invention, it was noted that automated remote services might suffer from the lack of customer involvement between the time a fault incident is received and when it is dismissed. Customers might have trouble planning available resources if they do not know when a problem might be addressed, and they might need to affect the automated process according to their needs.

Accordingly, the present invention provides a customer portal for accessing the status of fault incidents as they are being managed by a vendor. Preferably, the customer is provided an opportunity to change the status of an event via the portal. The basic advantage is that the customer is empowered with greater knowledge and control of fault-incident status, providing a more confident and effective support experience. These and other features and advantages of the invention are apparent from the description below with reference to the following drawings.

BRIEF DESCRIPTION OF THE DRAWINGS

The figures below pertain to specific embodiments of the invention and are not commensurate with the full scope of the invention.

DETAILED DESCRIPTION

Figure 1:
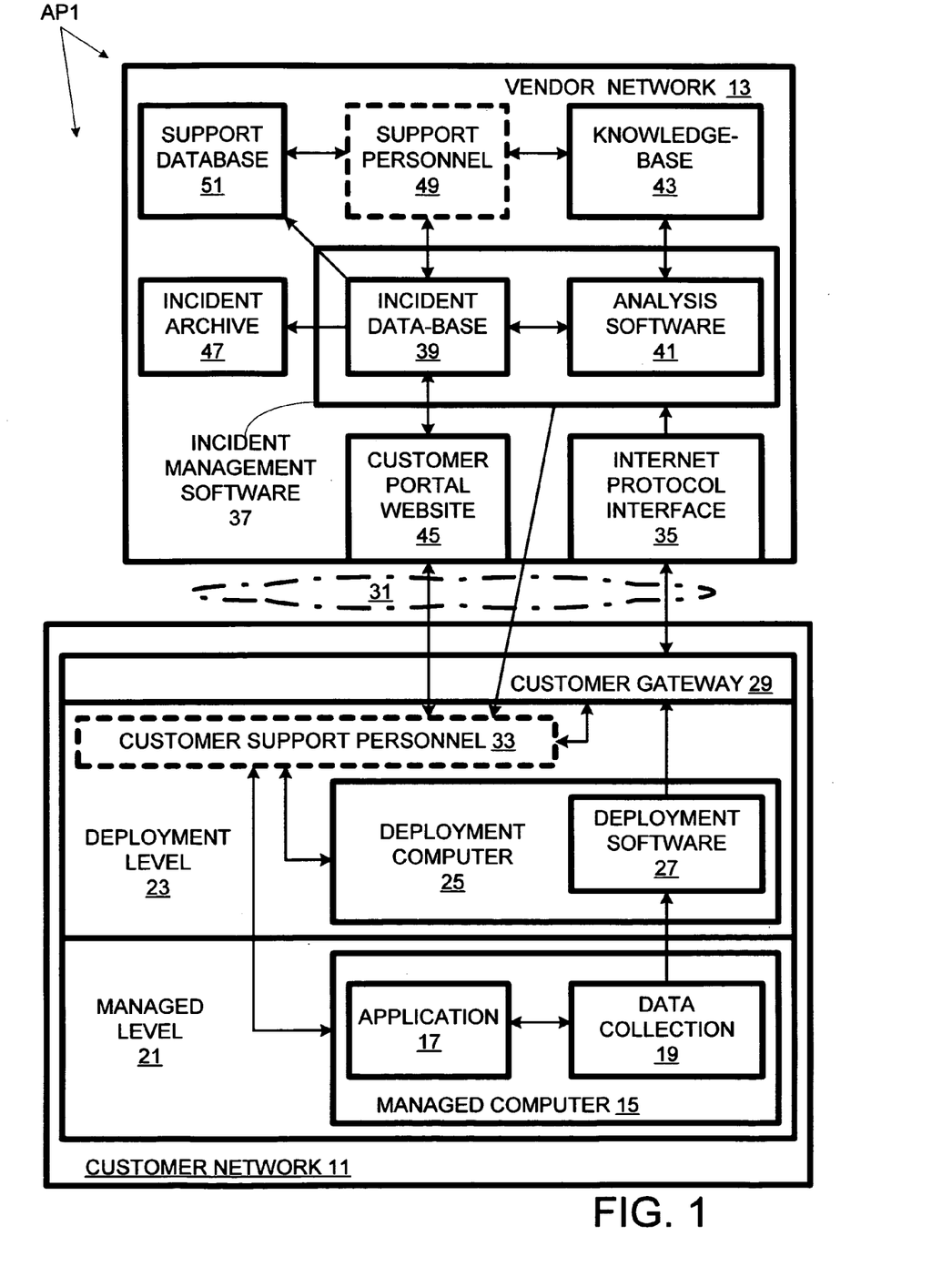
FIG. 1 is a block diagram of a computer service system in accordance with the present invention.

A computer service system AP1 shown in FIG. 1 serves as a specific embodiment of the invention. System AP1 includes a customer network 11 and a vendor network 13 that provides automated and human technical support to customer network 11. More specifically, customer network 11 includes a number of computer systems, including managed computer system 15 for running an application 17. One of the services provided by vendor network 13 is to address faults occurring in application 17. As explained further below, the invention provides for many alternatives to the embodiment illustrated in FIG. 1.

When a fault occurs with application 17, it is detected by diagnostic data collection software 19. Software 19 looks at the fault message and preset policies to determine whether or not to create an incident. If the policies do not disallow the creation of an incident, then it creates an incident ID using an algorithm that ensures a globally unique id. At this point the status of the fault incident is "creation". Diagnostic software 19 then proceeds with diagnostic data collection.

Diagnostic data collection software 19 gathers status data, such as computer and software configuration data, information on active applications and processes, resource utilization and performance data. Once gathered, the diagnostic data is subjected to pre-set customer-established policies which govern whether the diagnostic data software is to pass the diagnostic data on, ignore it, or submit it to the user for a decision.

In FIG. 1, customer network 11 is shown having three levels, a managed level 21, which is wherein managed computer 15 is located, a deployment level 23, which includes a deployment computer 25 running deployment software 27, and a gateway level or, more simply, customer gateway 29, which is a single computer system. Deployment level 23 manages computer systems on managed level 21, while customer gateway 29 securely manages communications between computer network 11 and the Internet 31. Despite the conceptual differentiation of levels, a given computer system can exist on more than one level; for example, computers on deployment level used to manage other computers have applications running on them that can incur faults and require support. Similarly, a computer system used as an Internet gateway can suffer faults and require support.

Customer's support personnel 33 typically operate computers on deployment level 23. This level is used to distribute software to managed level computers and to manage those computers. When a fault incident is passed from managed level 21 to deployment level, the fault incident is handled automatically according to preset deployment-level policies. The policies can be to transmit, to ignore the fault, to automatically correct the fault (if that capability is present), to pass the diagnostic data to vendor network 11, or to alert customer support personnel 33 so that they can make the decision. For example, a member of customer support personnel 33 can interact directly with managed computer 15, if necessary.

If the deployment policy or customer support personnel determines that diagnostic data should be sent to vendor network 13, it is passed to customer gateway 29. Customer gate 29 provides a firewall-enabled channel of communication for customer network 11 to the Internet, while protecting it from unwanted intrusions. Customer gateway 29 also has policies for passing or not passing diagnostic data to vendor network 13, for example, if many managed computers suffer the same fault concurrently so that they try to send similar diagnostic data to vendor network 13 (as might occur in a denial of service attack), customer gateway 29 can prevent or limit communication of diagnostic data to vendor network 13.

When diagnostic data is actually transmitted to vendor network 13, it is received at Internet protocol interface 35 and passed to incident management software 37. Incident management software 37 encompasses several programs, including an incident database 39 and analysis software 41. When incident management software receives diagnostic data, stores the diagnostic data in incident database 39. Also stored in association with the fault incident is its current status, which is in the "In Progress" state when entered into database 39.

Once a fault incident is "In Progress", analysis software 41 analyzes the diagnostic data according to various algorithms and provides a solution, which is a set of documents stored in knowledge base 43. The solution documents are published on a vendor website 45. In addition, a listing of available patches, recommended system configuration changes and a listing of discussion forum results can be published with the solution documents. An email notification is sent to customer support personnel 33, who can then access the document using a web browser on deployment computer 25. Customer support personnel can review the solution documents, implement the solution, and provide feedback on website 45. Once this processing is done, the customer may set the incident to closed; alternatively, the incident becomes closed after 30 days of inactivity. Once an incident is closed for sufficiently long, e.g., 90 days, it is archived in incident archive 47 and removed from incident database 32. Optionally, the fault incident, proposed solution, and feedback can be stored in a case base used to update analysis software 41.

While the state of a fault incident progresses automatically, computer support system AP1 provides for customer access and modification of incident status via customer portal website 45. Using a web browser, customer support personnel 33 can view the status of a fault incident and, in some cases, change the status. For example, a closed case can be reopened by the customer, for example, when it turns out that a solution does not work as anticipated. By reopening the case, the customer can request additional automated solutions or request human support from vendor support personnel 49. (System AP1 does not allow human support to be requested for a closed fault incident.) When human support is requested, the fault incident information in incident database 39 is used to create a support case in a separate support database 51. Vendor support personnel can then use both the support database and the incident database to solve the problem.

A method of the invention practiced in the context of the computer support system of FIG. 1 is flowcharted in FIGS. 2-6. Method M1 begins with the detection of a fault at step S21, FIG. 2. This fault may be an error, a crash, a freeze, or other problem with application 17. In response, diagnostic data is collected at step S22. This collection typically involves information regarding the nature of the fault and the computer and software configuration at the time of the fault. In addition, the diagnostic data can include information collected earlier regarding prior configurations, prior resource utilizations, and prior performance. The diagnostic data is transmitted to vendor network 13 at step S23, at which time diagnostic software 19 can notify the customer that an incident has been created and sent to vendor network 13. Typically, the diagnostic data is reviewed at the managed (using its own policies and policies from the deployment level) and gateway levels—at any of these levels, the diagnostic data can be prevented from being transmitted to vendor network 13 according to preset policies or manual intervention by support personnel; in those cases, method M1 ends at step S22.

Figure 2:
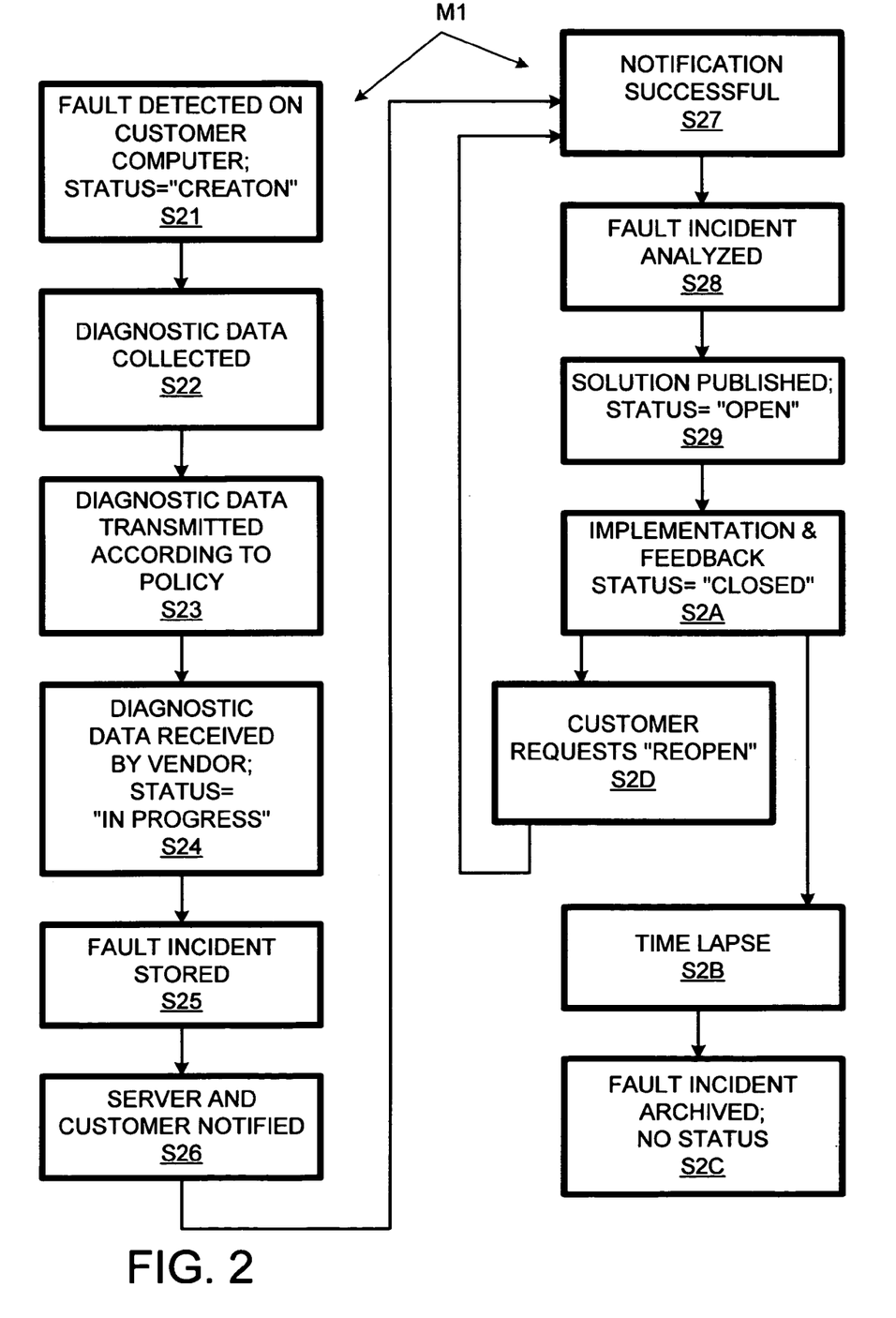
FIGS. 2-6 are flow charts of methods in accordance with embodiments of the present invention.

Diagnostic data that is submitted is received by vendor network 13 at step S24. Upon reception, the status is set to "In Progress". Subsequently, the server is notified that an incident has been created at step S26.

Once the server is notified of the available incident fault data from the customer, the server retrieves the data and performs an entitlement check (ensures that the customer has paid for the right to use the vendor's service). An alternate embodiment allows for the client to request and verify entitlement prior to sending the incident data to the server. After the entitlement checks are complete and thus "successful", the diagnostic data is analyzed by analysis software 41 at step S28. The resulting solution is published at step S29, which can also involve sending an email to a contact person of customer to let them know of the availability of the solution. Typically, the email can include a link to the site at which the solution is published. At this point, the incident status is "open". At step S2A, the customer implements the solution and, preferably, provides feedback on the effectiveness of the solution; at this point the customer can request that the incident status be set to "closed" or "closed" status can be entered upon a lapse of time without activity. After a duration, e.g., 90 days, of inactivity in closed status, as determined at step S2B, the incident is archived and removed from incident database 39, so that it has "archieved" status.

In accordance with the present invention, customer support personnel 33 can access incident database 39 and determine the status of a fault incident at step S2D. Also, the customer can change the status. The most typical case would be to change "closed" status to "open", in case an implementation fails and further support is needed.

Figure 3:
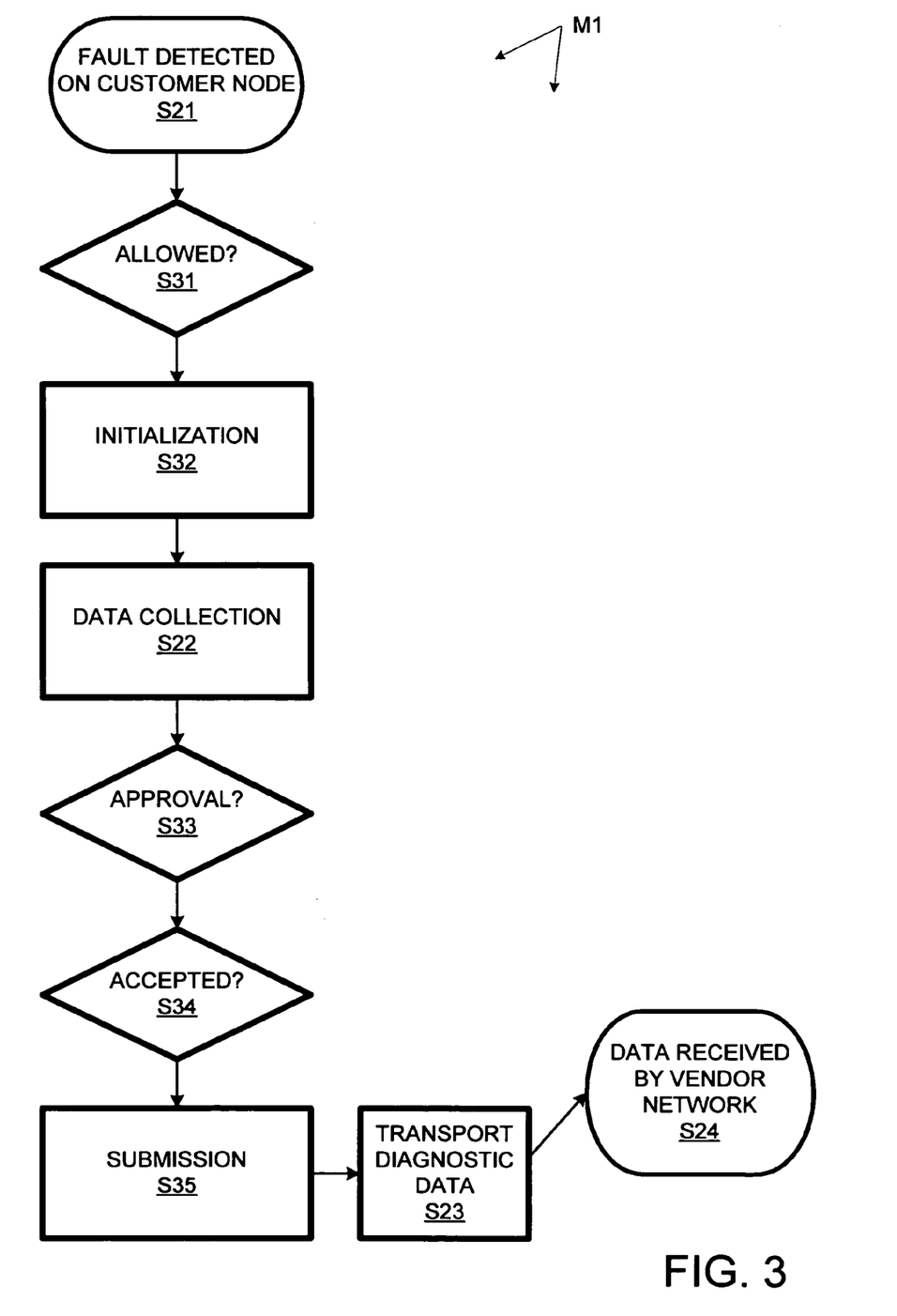

The portion of method M1 corresponding to steps S21-S24 is flow-charted in greater detail in FIG. 3. After a fault is detected at step S21, an initial decision is made whether to proceed with data collection or to ignore the fault at step S31. If data collection is allowed, the incident ID is created and assigned and data collection is initialized at step S32. Data collection proceeds at step S22. Once the data is collected, a decision is made to keep the data local or to approve forwarding it to vendor network 13 at step S33 (decision is made by a combination of automatic policies and optional manual approval). Finally, gateway 29 can accept the data for transmission at step S34, and submit it at step S35. The data can be transported via the Internet 31 at step S23 for receipt by vendor network 13 at step S24.

Figure 4:
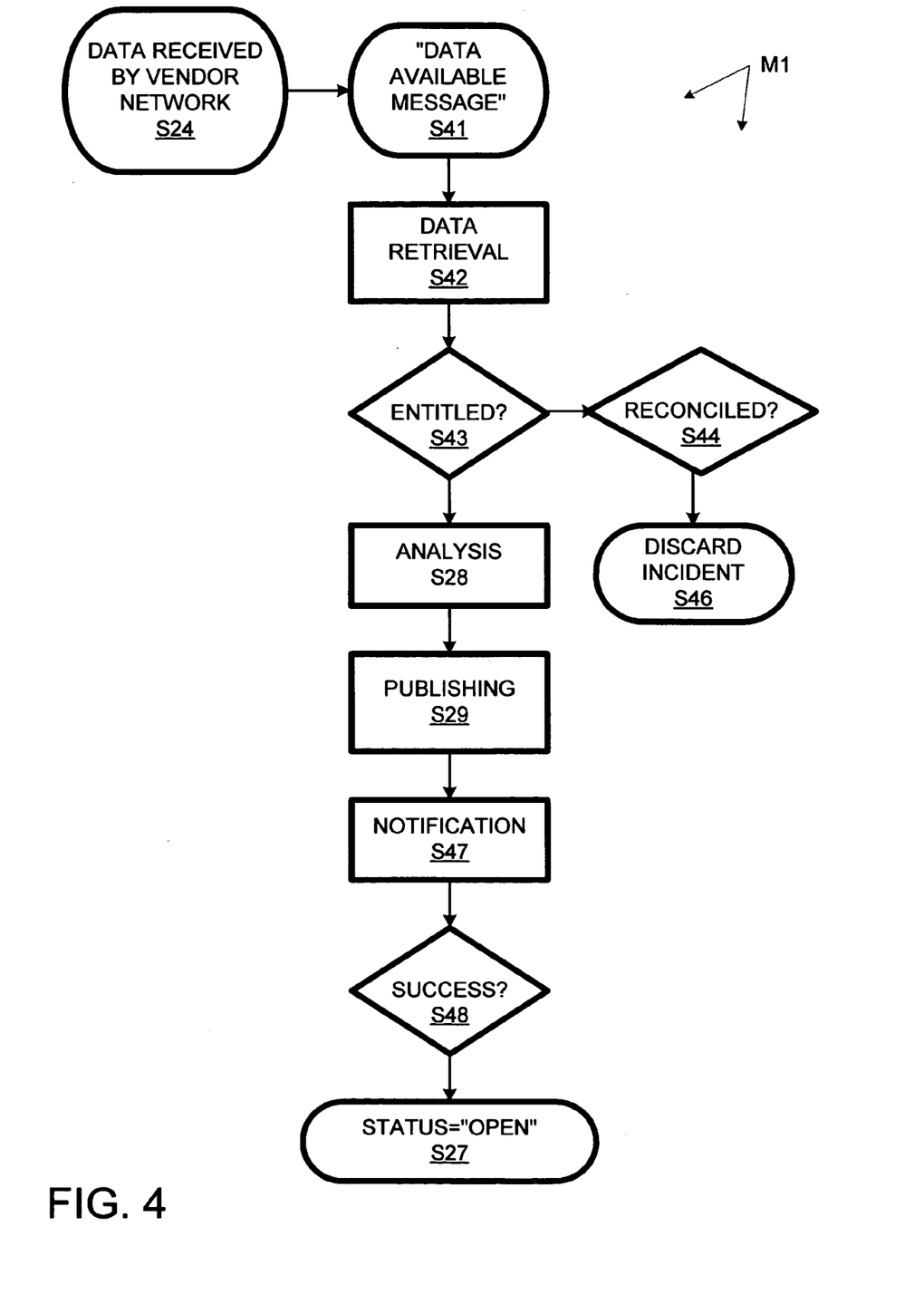

Continuing with FIG. 4, once data is received by network 13 at step S24, a data available message is transmitted at step S42. This triggers data retrieval at step S42 (data is retrieved from the internet protocol interface). The diagnostic data includes information as to the owner of managed computer system 15, which allows vendor network 13 to check a customer database to determine a level of entitlement for the fault incident at step S43. If there is no suitable level of entitlement, the incident is referred to entitlement reconciliation at step S44. This can involve notifying customer support personnel 33 of the entitlement problem and providing an opportunity to correct the lack of entitlement. If the entitlement is not reconciled within a preset duration, e.g., 30 days, the fault incident is discarded.

If entitlement is verified or reconciled, analysis can be performed at step S28. Once a solution is obtained, it can be published at step 29. The customer is then notified of the solution at step S46. If the notification is successful, then the incident status is changed to "open" at step S27.

Figure 5:
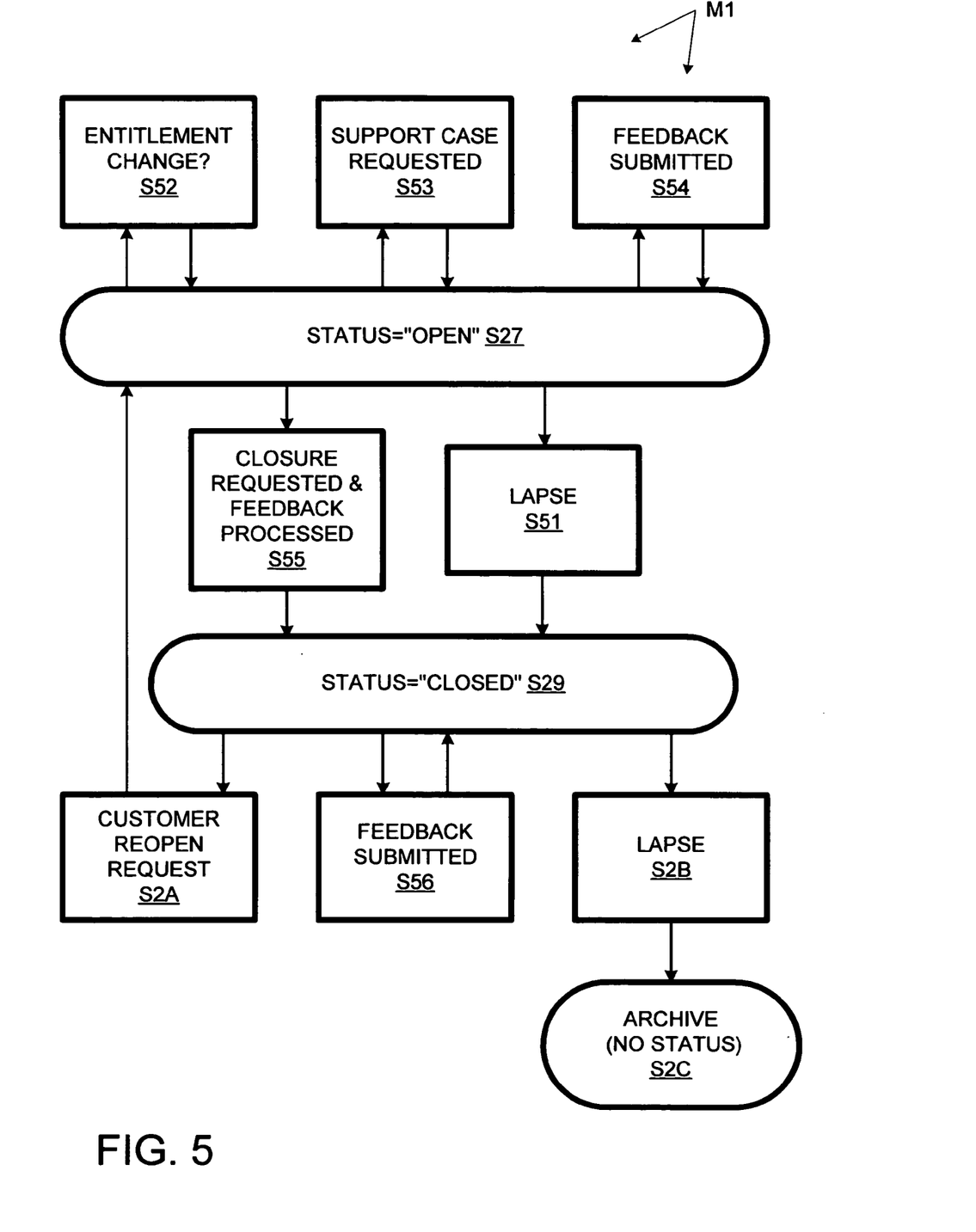

Continuing with FIG. 5, if open status is maintained without further activity for a preset duration, e.g., 30 days, the fault incident is closed at step S51. However, a variety of actions can cause the lapse period to reset; these include entitlement change at step S52, a support case request at step S53, and the submission of feedback at step S54. On the other hand, a customer can request that a case be closed at step S55, in which case the case is closed at step S29 once any pending feedback is processed.

Once an incident is closed, if a duration, e.g., 90 days, lapses without activity, as determined at step S29, the incident is archived and purged from fault incident database 39 so that it has no observable status at step S2C. However, customer feedback at step S56 can reset the duration. Finally, and, in accordance with the invention, a request by the customer to reopen the incident at step S2A results in a return to open status at step S27.

Figure 6:
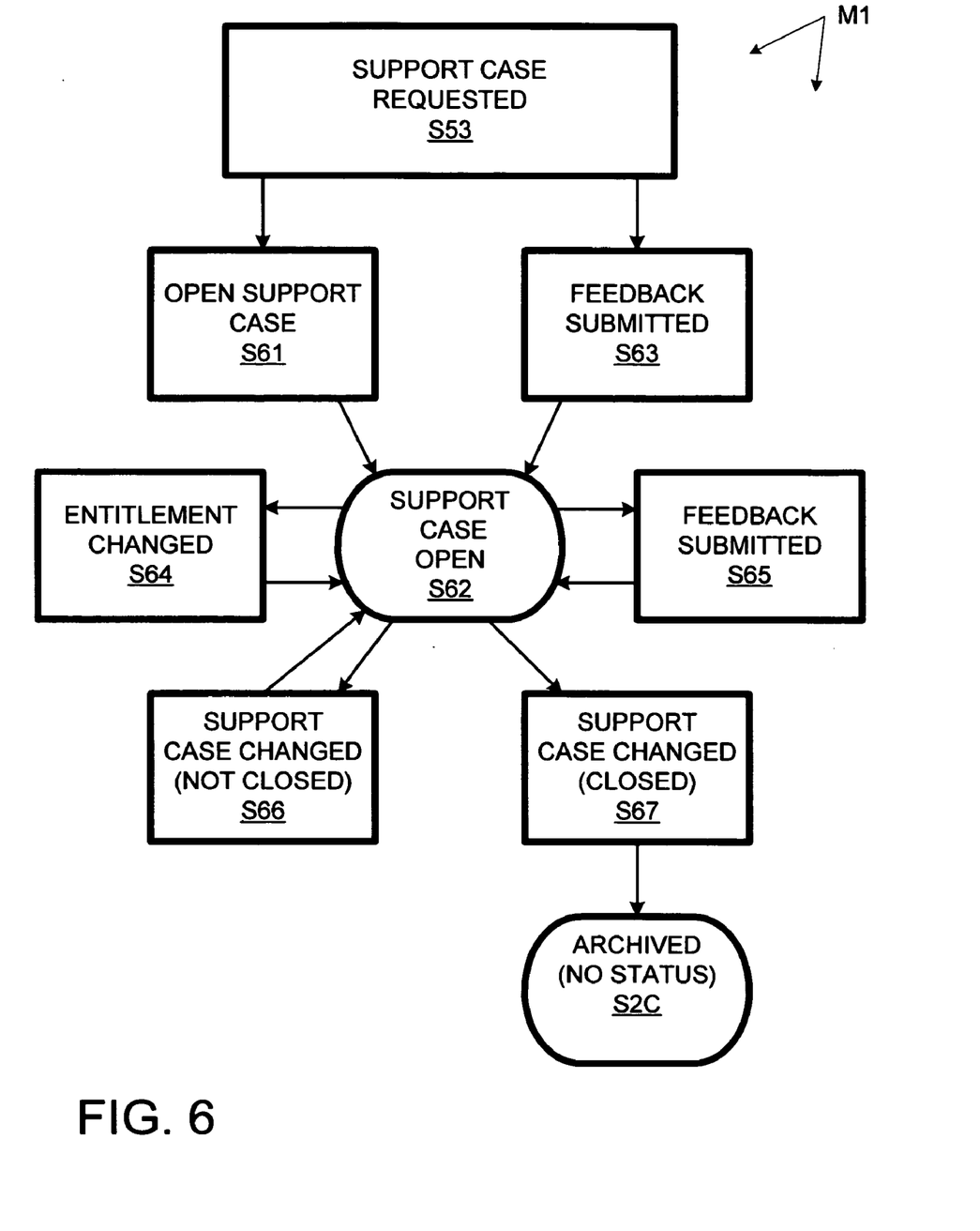

One of the reasons a customer might request that a closed incident be reopened is that system AP1 does not allow support to be requested for a closed incident. Once a closed incident is reopened, a support case can be requested at step S53. In response to such a request, a support case can be opened at step S61. This involves transferring incident data from incident database 39 to support database 51 and notifying support personnel 49 of the new case. A support case may also be opened when feedback is reviewed at step S63 indicates that human support is required. In either case, a support case has open status at step S62. Various events can occur without changing the open status of a support case. For example, the entitlement level can be changed at step S64 (i.e., increased to make human support available), feedback can be submitted at step S65, the support case can be changed without closure at step S66. Finally, the support case can be changed so that it is closed at step S67. In that event, the incident is automatically set to closed where it then follows the normal closure lifecycle (archived in 90 days) archived at step S2C. Further details are discussed below.

Goals and Constraints

Goals

The goals of the incident life cycle are:

To describe how the incident and its associated data are managed to ensure the following:

Customers should be able to control the creation of incidents     Customers should be able to control the data that the vendor has access to     Customers should be able to control their view of created incidents     Incidents reflect customer entitlement     Achieve consistency across the infrastructure     Support engineers should have easy access to incident data associated with support cases     Data should be appropriately captured for current and future analysis needs     Analysis effectiveness captured for inclusion in the knowledge base     Data should be appropriately captured for metric reporting     Incidents should not overburden customer or vendor production systems Constraints The constraints for the incident life cycle are:

Systems are distributed among multiple organizations with varying levels of control being given     to the vendor support personnel teams.

Customer environments and processes vary, so the vendor's self healing services offering must be able to handle this.

Available system resources.

Overview

The purpose of this overview is to describe how an Incident and its data should be handled at each stage of its lifecycle. This section (Overview) provides a brief look at incident handling.

Incident Types

The self-healing service is centered on the incident. An incident is the terminology used for any submission of data from the self-healing client to the self-healing server. There are specialized types of incidents submitted based upon the reason for the data submission. This document will take the approach of detailing how an incident of the type Fault is handled. It will then explain how each separate type differs from the primary type of Fault. Below is a brief explanation of the purpose of each type of incident.

System-Profile

A system-profile incident is a one-time incident that is created after a self-healing client node has been fully installed. The purpose is to gather a baseline data collection of the client node's environment.

Audit

An audit incident is submitted on a periodic basis from self-healing client node for the purpose of communicating the events that have occurred on that node. An audit may be combined with other audit incidents at a self-healing gateway node to create one coordinated audit incident for a set of nodes.

Connectivity

A connectivity incident is submitted for the purpose of testing the connectivity and configuration of a self-healing node to make sure that it can fully communicate with the self-healing server and has correctly configured its entitlement information.

Fault

A fault incident is the bread and butter of self-healing services. This incident type is the primary incident for communicating problems with the monitored software. A fault incident goes through complete analysis report generation and is eligible for customer support case creation.

Additional-Data

An additional-data incident is submitted as a supplement to a previously submitted Fault incident. It carries a payload of data that was not collected or passed on the initial incident submission.

System-Assessment

System assessment is a specialized type of incident that is provided for certain customers (non-entitled submissions are rejected by the self-healing server). It is very similar to a System-Profile. The customer will be able to submit this through the self-healing client so that HP will have access to it in order to provide a customer review of the customer's system.

Basic Incident Flow

As stated before, this document will take the approach of detailing how an incident of the type Fault is handled and will follow that up with incident type specific deviations. This section (overview) will deviate from that approach for the purpose of avoiding unnecessary duplication of verbiage. Refer to the FIG. 1 for graphical context.

An incident can be automatically or manually triggered. For the purposes of the incident life cycle it does not matter how the incident was triggered. In most cases, data is collected specific to the product(s) that have been detected with a problem.

The collected data is transferred to vendor network 13 via the incident transport architecture. Communication to vendor network 13 is facilitated by the ISEE infrastructure. The end result is that the incident is received by the self-healing server.

Incidents are stored in the self-healing fault-incident database. Some are then entitled for further servicing. Those that require further servicing are passed along to the correct services.

Further servicing differs, but often includes having the data analyzed and a custom report created on customer visible software support portal 45. It usually also includes sending a notification to the customer informing them of the incident arrival and of the services that were performed on the incident. If applicable, the notification includes a URL link to view any customer visible reports related to the incident.

Feedback

Fault incidents result in a customer visible analysis report. Customers and support engineers can supply analysis feedback which is used to improve the usefulness of the analysis.

Support Case Request

The customer may choose to request a support case for a Fault incident. The case notes include references to the analysis report for the incident as well as to the support engineer data view web interface which allows support engineers to view the raw incident data collected by the self-healing services client.

Closure Request

A Fault incident can be closed through customer request, expiration or due to the associated support case being closed. When it is closed, the status is reflected on the analysis report (via the support portal).

Incident Archived

An incident can be archived through expiration. The incident is removed from the support portal when it is archived.

Incident Data Ownership

Customer

The customer owns exclusive rights to define when an incident is initiated and what data is allowed to be sent to vendor network 13. The customer also shares the right to request that an incident be "closed". Closing an incident is an event that causes the customer's view of their incidents to change and the incident to move to the incident closed state, but does not necessarily cause the data to be removed from the vendor's data warehouses.

Vendors

As soon as a customer allows an incident submission, the vendor owns the data and is responsible for the privacy and safety of the data. The vendor will determine when the data is, if ever, removed from the vendor's data warehouse systems.

Lifecycle States—Introduction

Incidents have a very specific lifecycle from a customer point of view. This document approaches the incident from a UML perspective on state, utilizing the concepts when appropriate. One important note is that this document does not explicitly cover unexpected system errors.

Fault Incident General Lifecycle

This document will take the approach of detailing how an incident of the type Fault is handled. It will then explain how each separate type differs from the primary type of Fault.

Fault incidents can be in one of several general states (also known as compound or composite states) and within each general state there are several sub-states and activities, some of which may not be important to the customer although they are very important to HP. The general customer viewable states that a Fault incident can be in are:

Creation
In Progress
Open
Closed
Archived

FIG. 2 depicts these states. (Note that the archived state is represented as the end of the incident lifecycle and is the exit point).

The rest of this document will provide the detail about each of these general states.

Incident Type Specific Deviations from Fault

System-Profile

System-Profile incidents are triggered once the client has been fully installed. They are not submitted until the first time a fault is detected. These incidents leave the In Progress state after data storage and go directly to Archived.

Audit

Audit incidents are triggered based upon pre-set time intervals. They leave the In Progress state after data storage and go directly to Archived.

Connectivity

Connectivity incidents are triggered manually by the user and also automatically when certain client node configuration items change (like entitlement information). Connectivity incidents leave the In Progress state after data storage, entitlement and notification and go directly to Archived.

Additional-Data

Additional-Data incidents are triggered manually by the user. Additional-Data incidents are treated as operations on a pre-existing incident once they reach the server. They have activities performed that could be considered part of the In-Progress state, but these incidents' lifecycle do not maintain a separate existence from the pre-existing incident from which they were submitted.

System-Assessment

Technical assessments are triggered by a manual request from the customer. These incidents leave the In Progress state and go directly to the archived state after data storage, entitlement and notification.

Lifecycle State—Creation

The creation state includes all of the activities that occur on the self-healing client(s) and the transport layer. Creation of Fault-type incidents are triggered by the fault detected event (which can be manual or automatic) and include the sub-states/activities of initialization, data collection, approval, submission and data transport to the vendor. Customers do have an opportunity to break out of the incident creation state based upon customer defined rules (filtration policies). They can do this during an optional approval stage before actual transmission to vendor network 13 (the optional aspect is detailed below). During this approval stage, customers are allowed to selectively disallow portions of the data from being submitted. After this point, there is no way for a customer to explicitly remove the incident from the creation state once the incident submission has been approved by the customer. The incident is officially transitioned out of this state into the In Progress state when the data received event fires on the self-healing server and the customer receives notification that the incident data has been received.

The events listed below can be produced and consumed for Fault-type incidents from within the Incident Creation state:

Fault Detected

Incident Submission Review Requested (per customer rules)

Incident Submission Accepted

Certain portions of the incident data may be removed by the user

Incident Submission Rejected

User deletes the incident

User ignores indefinitely

Data Received

FIG. 3 shows the sub-states of the Incident Creation general (composite) state for Fault-type incidents.

Incident Type Specific Deviations from Fault

System-Profile

System-Profile incidents are triggered once the client has been fully installed. They are not submitted until the first time a fault is detected.

Audit

Audit incidents are triggered based upon pre-set time intervals. These incidents do not include a data collection. They simply categorize and detail events that have happened on the given client node. In addition, audit incidents are sent to a gateway node where the gateway node sums all of the audits that it receives in a given time period into a single audit incident.

Connectivity

Connectivity incidents are triggered manually by the user and also automatically when certain client node configuration items change (like entitlement information). These incidents do not have a data collection.

Additional-Data

Additional-Data incidents are triggered manually by the user. These incidents do not go through a data collection or approval state. The primary difference is that the user specifies the data to send and the data must be sent for a previously created incident.

System-Assessment

System assessments are triggered manually by the user. They go through the below steps:
1. Customer access self-healing client (any managed node) and goes to system assessment submittal page.
2. Once customer submits the system assessment, an incident ID is generated, a basic system collection is performed and an incident of the type SYSTEM-ASSESSMENT is submitted to vendor network 13.

The rest of this section details the events, activities and sub-states occurring within the creation state for Fault-type incidents. Refer to the above for differences unique to other types of incidents.

Event—Fault Detected (manual or automatic)

The Self-Healing Services process called 'AppMon' detects faults (varies depending upon the product) and automatically triggers initialization of a new incident. Alternatively, the customer can trigger initialization of an incident via the client GUI. Tight integration with product bedrock components (common logging) will provide a product-level fault trigger and better context-specific tracing and logging information for the fault. This event defines the entry into the incident creation state where multiple events, activities and substates can be encountered. The Event Receiver handles all further creation activities.

Activity—Check Fault Policy

The user can define a policy to selectively ignore fault detection events. Whenever a fault is detected, the policy is checked to see whether or not an incident should be created. No further activities are performed and the fault is ignored if the policy states that the fault should be ignored. However, if the policy does not say to ignore the fault, then the create incident activity is performed.

Activity—Create Incident

This activity is started as a result of the fault detected event, but is only started after the customer's fault policy is checked and the fault is not explicitly excluded. Besides an abnormal system error, the only way to break out of this activity is a submission rejection during the approval process. This activity consists of multiple activities and internal events that push the incident through many sub-states. The activities that occur within a discrete unit of work are represented as sub-states of the create incident activity.

Sub-state/Activity—Initialization

This is the first point when an incident actually exists. A unique incident ID will be created. At this point, the only gathered data is the name of the application that has a problem, the problem description and possibly context information that will be used to determine what data to gather.

Sub-state/Activity—Data Collection

This is where system and application information is gathered. The Event Receiver starts the Recon process to gather context specific information for the detected fault. The output is usually XML and raw text files.

Sub-state/Activity—Approval

This is where the user can decide whether or not to send the incident on to HP. This can be a manual or automatic approval process depending on the customer data approval rules. If the customer's rules request a review, then explicit approval by the customer is required before the incident is submitted to the vendor. These rules can specify to always approve automatically, approve based on how much time has passed or to always require manual intervention. The incident creation state is maintained, but the overall create incident processing is halted until the data submission is accepted.

This activity has four possible outcomes:

Data submission accepted

User filters sensitive information and approves

The user deletes the incident

The user does nothing and the incident stays in this state indefinitely.

Customer feedback will be used to later determine if an aging policy is required.

The incident will be in the approval state as long as the data submission is not accepted. If the user does not want a particular incident to ever be submitted to HP, then they must delete the incident.

Sub-state/Activity—Submission

The incident and associated data transport process to HP is started. At this point there is no way to stop the submission.

Sub-state/Activity—Data in Transport

After submission, the incident is out of the control of the self-healing client application until it reaches the self-healing server. Data transport varies depending on whether or not the client node that generated the incident is also acting as a gateway node. Regardless of the role, there is not a way to stop data transport once the incident has been submitted.

Client (managed) nodes that use a gateway node to communicate their incident to HP must first notify and send the incident to the gateway node. Data transport is performed the same once at the gateway node. Note that gateway nodes may also act as a managed node that can create and submit its own incidents.

Data in Transport—Server Collection Provider

Gateway nodes communicate to vendor network 13 through the self-healing services Server Collection Provider. Currently, the only server collection provider is the vendor's ISEE infrastructure. The data transport from the customer's environment to the vendor is completely handled by the vendor's ISEE infrastructure once the data has been handed off to the vendor's ISEE client. A self-healing gateway node uses the ISEE HTTP proxy and must be a node that has external internet access.

Note that items handled by the vendor's ISEE (transport time, transport success, and completion JMS notification) are not guaranteed. The self-healing server uses a backup polling mechanism to make up for JMS notification issues, but cannot avoid a complete transport failure. So this sub-state has fault tolerance and performance implications Lifecycle State—In Progress In Progress includes all of the automated activities that occur on the self-healing server after incident creation. Fault-type incidents include the entitlement, analysis, publishing and notification activities. All these activities are driven from the Server Collection Provider (vendor ISEE) notification to the self-healing server that incident data is available. There is not any way for a customer to explicitly remove the incident from the in progress state unless an entitlement failure occurs and the customer does not reconcile the entitlement through the defined re-entry point. The incident is officially transitioned out of this state into the incident Open state when the notification event to the customer successfully occurs indicating that the incident report is ready to be viewed. (See incident Creation section for life cycle details prior to this point.)

The events listed below can be produced and consumed from within the Incident Creation state:

Data Available Message

Entitlement Failure

Entitlement Reconciled

Entitlement Not Reconciled

This diagram shows the sub-states of the Incident Creation general state.

Incident Type Specific Deviations from Fault

System-Profile

System-profile incidents leave the In Progress state after data storage and go directly to Archived.

Audit

Audit incidents leave the In Progress state after data storage and go directly to Archived.

Connectivity

Connectivity incidents leave the In Progress state after data storage, entitlement and notification. The notification message sent is different from a Fault incident. Connectivity notification informs the customer that the incident was received and that the client appears to be configured correctly with correct entitlement. After notification, they go directly to Archived. Connectivity incidents do not go through analysis or publishing.

Additional-Data

Additional-Data incidents are treated as operations on a pre-existing incident once they reach the server.

They have activities performed that could be considered part of the In-Progress state, but these incidents do not maintain a separate lifecycle from the pre-existing incident from which they were submitted.

Additional-Data incidents go through data-storage and then go through entitlement, publishing and notification. The notification process is altered from a Fault incident in that a "data received" message is sent rather than a "report ready" message. These incidents do not go through analysis. If a support case is open for the original incident, then a case history line noting the new data received is added to the support case.

System-Assessment

System-Assessment incidents do not ever move to the Open state. They are not published or analyzed.

The steps for a system assessment while in the In-Progress state are below:

1) HP receives the system assessment and stores the report.
2) Normal entitlement takes place (Software support enhanced status is analyzed and noted).
3) Routing uses a decision point to determine which what to do next to send.
   a) If the entitlement data shows software support enhanced, then no additional automated handling occurs.
   b) If the entitlement data shows non-software support enhanced, then an email is sent to all contacts that the system assessment was received, but since the customer is not entitled then no additional processing will be done with it unless the customer fixes the entitlement manually. The email will include a link to customer support portal that details how to reconcile the entitlement.
4) Incident is set to Closed.

The rest of this section details the events, activities and sub-states occurring within the In-Progress state for Fault-type incidents. Refer to the above for differences unique to other types of incidents.

Event—Data Available Message

After submission from the client, the incident transport to the self-healing server is provided by the selfhealing server collection provider. The server collection provider notifies the self-healing server of new incidents via the data available message. Currently the vendor ISEE is the only server collection provider, so the data is out of the control of the self healing application until it reaches the self-healing server. During this time, the data is completely handled by the vendor ISEE infrastructure. Transport time, transport success, and completion data available notification are not handled by the self-healing server. The self-healing server uses a backup polling mechanism to make up for any data available notification issues, but cannot avoid a complete transport failure. Either the polling mechanism or ISEE can generate a data available event.

Sub-state/Activity—Data Retrieval

After the self-healing server receives a message indicating that data has arrived in the server collection provider (vendor's ISEE configuration database), it launches a data retrieval agent to pull a copy of the data from stores the new data in the self-healing server incident database. The server then dispatches specialized agents to process the data further, starting with the entitlement agent.

Sub-state/Activity—Entitlement Verification

The self-healing server entitlement agent validates the customer's entitlement ID. If it is not valid, the entitlement failure event occurs and the incident In-Progress activity is put on hold. It is restarted if an Entitlement Reconciled event is received. It is aborted if an Entitlement Reconciled event is not receivedwithin 45 days.

Event—Entitlement Failure

This is an event that can be produced by the self-healing server during the entitlement verification activity.

This event occurs if the entitlement ID passed in through the collected incident data does not pass entitlement checking using the SGBU entitlement system ACES. Customers must have a valid and current support contract to pass entitlement checking. The incident In-Progress state is maintained, but the processing is halted until entitlement is reconciled. When halted, the incident is placed into the sub-state of Incident In Progress: Entitlement Hold.

Activity—Prepare for Entitlement Reconciliation

There are effects on multiple systems when entitlement reconciliation is prepared. The effects are described below.

Self-Healing Server

The server generates an entitlement "passkey", publishes a reconciliation request to the support portal and sends a notification to the customer that contains the URL to use for entitlement reconciliation.

Customer Support Portal

The support portal servers accept the reconciliation request and store it for future reference. It does nothing else until the customer performs entitlement reconciliation.

Sub-state—Entitlement Hold

If the incident creation state is placed into hold due to entitlement failure, it will move into the sub-state of entitlement hold. As long as an incident is in entitlement hold, it will not move back into the normal processing activities of the incident In Progress state. The incident leaves this sub-state when entitlement is reconciled.

Incidents can only remain in the entitlement hold sub-state for 45 days. If they are not reconciled within 45 days, then the incident In Progress state will be aborted and the incident will be archived without any further processing. The entitlement reconciliation request will be unpublished from the support portal.

Future investigation will be done on how to handle incidents from customers that continue to flow in without valid entitlement IDs.

Event—Entitlement Reconciled

This is an event that is produced by the support portal when a customer reconciles their entitlement. The outcome of this event is that the incident In Progress state is re-entered at the point that it was stopped for entitlement.

Activity—Update Incident Data and Continue In Progress State Activities

There are effects on multiple systems when entitlement is reconciled. The effects are described below.

Customer Support Portal

The customer reconciles entitlement by following the customer support portal link provided in the entitlement failure email. The support portal accepts customer requests to reconcile entitlement for a specific incident, verifies a new entitlement ID (with the SGBU entitlement system ACES) through an interactive session with the customer, notes the reconciliation on support portal's stored data (to prevent secondary requests) and ensures transmission of the entitlement data to the self-healing server.

Self-Healing Server

The self-healing server accepts reconciliation requests, stores the entitlement data in the database, coordinates an un-publishing activity to ensure removal of reconciliation data from the support portal's data store and then restarts the normal incident In Progress activity from the point that it was halted.

Sub-state/Activity—Analysis

The data is then processed by an analysis engine, which will generate supplemental information for the data set retrieved from the customer system and add it to the self-healing database. Note that the analysis activity includes the following sub-activities:

Patch Analysis

Knowledge Base Search Analysis

Forum Search Analysis

Case Based Reasoning Analysis

Product Configuration Analysis

Sub-state/Activity—Publishing

The analysis information is next published to the customer support web portal where it can later be viewed by the customer and support engineers. The output of publishing is an XML structure that combines relevant input incident data with output analysis data. It should be noted that the incident state field is set to "Open" just prior to publishing, but this is only due to sequential processing requirements and ensures that the customer support portal displays it as open for the customer.

Sub-state/Activity—Notification

Once publishing is complete, notification may be sent to the customer informing them that the incident is now ready (Open). Notification checks with the incident contact data prior to actually sending messages to the contacts. If the contacts do not wish to receive a notification message then no messages are sent.

Notification is considered complete when all contacts messages have been sent (which may be zero messages). Once notification is complete, the In Progress state is exited and all of its associated activities are finished. The incident is transitioned to the next general (composite) state of Open by the Incident Lifecycle Manager.

Lifecycle State—Incident Open

The Open state is the state where customers interact with the processed incident. Currently only Fault-type incidents are capable of reaching the Open state. This state is entered after the incident contact(s) have received notification that the incident is ready to be viewed. End of notification signifies that the In Progress state has been exited. (See incident In Progress section for life cycle details prior to this point.)

There are several main events that can be consumed from the incident Open state. Some cause the incident to remain in the Open state, while others cause the incident to transition to the incident closed state.

Customer changes entitlement information.

Customer or (Support Engineer (when support case initiated)) sends feedback on the analysis.

Customer requests support case for the incident.

Support case associated with an incident experiences a state change

Special handling for support case closure

Customer closes the incident.

Incident expires from non-action by the customer (no feedback, support case or close requests).

Customer submits additional data on the incident (perhaps due to support engineer request).

FIG. 6 depicts this state.

At this point in time, incident data exists on four systems with each potentially consisting of multiple servers and components:

Customer system(s)
Client-side incident repository. Note: the data on the customer system may be deleted by the customer while an incident is in an Open state. The incident data will only exist on the node that originated the incident. If this is different than the gateway node that facilitated the data transport, then the data will not also exist on the gateway.
ISEE o Config DB
Self-Healing Server
Self-Healing Server Database
Customer Support Portal
Published incident repository During this state, data has the potential to also exist on the following systems depending on the actions and events that occur during this state (Support case requested):

Support Case Management Systems (Support Engineers)
SGBU Case Manager (Service Desk DB)
Vendor Services WFM (Clarify ClearSupport DB)
Incident Type Specific Deviations from Fault Currently only Fault-type incidents are capable of reaching the Open state. The rest of this section describes what exactly occurs to the incident and its data when the above events are consumed.

Additional-Data

Additional-Data incidents are treated as operations on a pre-existing incident once they reach the server.

They have activities performed that could be considered part of the In-Progress state, but these incidents lifecycle do not maintain a separate existence from the pre-existing incident from which they were submitted. If an incident is in the Open state, then the additional data submission does not change the state of the original incident.

Event—Customer Changes Entitlement Information

Customers can change entitlement information for incidents through the customer support portal.

Activity—Change Entitlement Information

There are effects on multiple systems when an entitlement change request is submitted. The effects are described below.

Customer Support Portal

The customer support portal accepts the request and ensures transmission of the entitlement information to the self-healing server.

Self-Healing Server

The self-healing server accepts entitlement information change requests and stores the data in the database.

It then coordinates a publishing activity to synchronize the customer support portal servers with the latest entitlement information. (This is done because the Self-Healing Server is considered the master of all incident data changes and makes no assumptions about the incident data changes that the customer support portal may make to its repository.)

Event—Feedback Submission

Feedback is used to improve the self-healing service and is used as input to the analysis engine. It is always available as an optional service during the Open state and can be submitted as many times as the customer wants. Also, if there is a support case opened on the incident, support engineers are requested to submit feedback when the associated support case is closed.

Activity—Process Feedback

There are effects on multiple systems when feedback is submitted. The effects are described below.

Customer Support Portal

The customer support portal accepts the request and ensures transmission of the feedback to the selfhealing server.

Self-Healing Server

The self-healing server accepts feedback requests and stores the data in the database. It then coordinates a publishing activity to synchronize the customer support portal servers with the latest feedback time stamp. (This is done because the Self-Healing Server is considered the master of all incident data changes and makes no assumptions about the incident data changes that the customer support portal may make to its repository.) The data stored in the database is later used for analysis engine input and metric reporting.

Event—Support Case Requested

Customers can request for a support case to be opened for an incident if they feel that they need support engineer assistance. What this means is that a support case is opened and the incident is associated with it. The incident only changes to the sub-state of Open: Support Case Open. This can only be done once for each incident. Once a support case is initiated, the incident is essentially transitioned to vendor support engineer control and can only be closed once the associated support case is closed.

Activity—Open Support Case

There are effects on multiple systems when a support case is requested. The effects are described below.

Customer Support Portal

The customer support portal accepts the request and ensures transmission of the request to the self-healing server. The support portal also accepts an update to an incident's published data once the case is created. This update includes the customer viewable support case number (external ID) and is used for deriving graphical display elements.

Self-Healing Server

The self-healing server accepts the support case request, stores the data in the database and initiates a case creation request with a registered support case management provider. For HP, this is the SGBU Case Manager system. Case Management providers must provide the customer viewable support case ID to the self-healing server. This may be a synchronous or asynchronous process. It coordinates a publishing activity to synchronize the support case information with the customer support portal once the self-healing server has the customer viewable support case ID from the support case management system.

Support Case Management Provider (SGBU Case Manager)

The case management provider accepts the support case request from the self-healing server and creates a new support case. The case management provider may by synchronous or asynchronous.

- A synchronous provider immediately returns a customer viewable case ID number (external ID).
- An asynchronous system immediately returns an internal reference number (internal ID). This is not a customer-viewable number. The case manager can do any required work and return the customer viewable case ID number at a later point in time. (SGBU Case Manager is an asynchronous provider that brokers the request to the vendor Services WFM systems.)

Vendor Services WFM

WFM receives the case creation request from the SGBU Case Manager and creates a case; returning the customer viewable id number to the SGBU Case Manager.

Sub-state—Support Case Open

Once the support case creation event is consumed and the activities complete, the incident remains in the Open state as long as the associated support case is open. For HP, support engineers interact directly with WFM while customers interact directly with support engineers or though the SGBU Case Manager interface. The incident cannot be closed as long as there is an open support case.

Event—Customer Submits Additional Data

Customers can submit additional data on an incident. This is typically done due to a request from a support engineer on an incident that had a support case opened for it. This event can actually happen at any time and does not require an incident to already have a support case opened for it.

Activity—Accept and Process Additional Data

There are effects on the customer system and multiple HP systems when additional data is submitted.

Self-Healing Client Node

The self-healing client managed node submits a new incident of the type Additional-Data. See creation.

Self-Healing Server

The self-healing server accepts that incident request from the server collection provider (Vendor ISEE) and goes through the activities specified in the Additional Data section of the In Progress state, but the incident is never actually changed from the open state. The incident is essentially treated as an operation on a previous incident once it reaches the server. The server will send a history line request to the support case management provider and include details about the additional data submission (including the link for access the UI view of the data).

Customer Support Portal

The support portal accepts an update to an incident's published data once the additional data is stored. This update includes the link to the support engineer viewable UI which provides a way to view the additional data.

Support Case Management Provider (SGBU Case Manager)

If a support case is open for the incident, then the self-healing server will send a history line request to the support case management provider and include details about the additional data submission (including the link for access the UI view of the data).

Event—Support Case State Change (Not Closed) Requested

Support case state change events are triggered from a support case management provider in response to support engineer or direct customer requests. A support case state change event (not closed) causes the self-healing server to update the case data that it has stored.

Activity—Update Case Data

There are effects on multiple systems when a support case state is changed (not closed). The effects are described below.

Support Case Management Provider

A case's state is changed either directly from a customer request/authorization or at the discretion of the support engineer. The case management provider must propagate the state change to the self-healing server by sending the message to the self-healing server.

Self-Healing Server

Self-Healing server receives the request and updates the incident data. It then publishes the change to the customer support portal.

Customer Support Portal

The support portal accepts an update to an incident's published data once the state data is stored.

Event—Support Case State Change (Closed) Requested

Support case state change events are triggered from a support case management provider in response to support engineer or direct customer requests. A support case closure event causes the self-healing server to generate an internal incident closure event.

Activity—Close Support Case

There are effects on multiple systems when the support case is closed. The effects are described below.

Support Case Management Provider

A case is closed either directly from a customer request/authorization or from an automatic closure date set in the case by the support engineer (often the case when customers do not respond to support engineer requests). The case management provider must propagate the state change to the self-healing server by sending the message to the self-healing server. For the vendor, the effects are reflected on vendor Services WFM and SGBU Case Manager.

Vendor Services WFM

WFM will notify the SGBU Case Manager of the closure. The support case is set to the closed state and shows up in WFM metric reporting. Data warehousing of the WFM servers is done according to the vendor's Services policies.

SGBU Case Manager

SGBU Case Manager receives the WFM closure notice and closes its internal case. It then sends a notice to the self-healing server. Data warehousing of the SGBU Case Manager servers is done according to the SGBU eBusiness IT policies.

Self-Healing Server

Self-Healing server receives the request and updates the incident data. This in turn generates an incident closure event.

Event—Incident Closure Requested

Incidents can be closed. This allows for better usability of self healing user interfaces, better resource management on production servers, metric tracking by management and creates an input item for the selfhealing analysis engine. Incidents can be closed by three events:

Customer requests that the incident be closed (only when support case is not opened).

Incident expires.

The following events are under investigation.

Product exits support life.

This event should normally be handled by normal incident expiration.

This section describes the activities that are performed which transition the incident to the closed state.

Detailed information on what it means to be in the closed state can be found in the Lifecyle—Incident Closed section.

Activity—Close Incident

When an incident is closed, there are effects on multiple systems. The effects are described below.

Self-Healing Server

The self-healing server is the central controller of incident closure events. It both consumes and produces events that cause it to coordinate an incident closure. The self-healing server consumes closure events from the customer support portal. It produces a closure event when it determines that an incident has expired or when an incident receives notice that its associated support case has been closed.

When an incident is closed, the self-healing server coordinates several things:

The incident status is updated for metric reporting and analysis trending.

A publishing job republishes the incident to the customer support portal so that the closure status is reflected on the UI (report list).

Customer Support Portal

The customer support portal allows the user to request closure of an incident if it does not have an associated open support case and if the incident isn't already closed.

The customer support portal accepts publishing requests that move the incident data to the closed state.

The UI appropriately uses the data to create a view of closed incidents in the report list.

Customer System

Data retention on the customer system is manually controlled by the customer. The customer may delete the data at any time.

Event—Incident Expires

Incidents that are not explicitly acted upon by a customer within a set amount of time can expire unless they are directly tied to an open support case. Expiring means that the incident is considered not relevant or useful to the customer and is safe to close. This expiration is separate from data archival strategies. Table I below summarizes actions and their effect on an incident's expiration.

TABLE I

Events Affecting Incident Expiration

| Event | Effect |
| --- | --- |
| Incident expires - no tracked activity for 30 days. | Incident is closed. (Note that this rule is not processed if the incident has an associated open support case.) |
| Feedback submitted (customer or support engineer). | Activity tracked - expiration timeline delayed according to expiration rules. |
| Support case requested for incident. | Activity tracked. Incident expiration rules overridden until support case closed. |
| Incident support case closed. | Activity tracked. Incident is closed. |
| Customer requests incident closure. | Activity tracked. Incident is closed. (Note that a customer can not close a case that has an associated open support case.) |
| Additional data received | Activity tracked - expiration timeline delayed according to expiration rules. |

Lifecycle State—Incident Closed

Incidents can be closed. This allows for better usability of self healing user interfaces, better resource management on production servers, metric tracking by management and creates an input item for the self healing analysis engine. Only Fault-type and System-Assessment-type incidents can be in the closed state.

See the Lifecycle—Incident Open: Incident Closure Requested section for information about the activities that transition an incident to the closed state. An incident is not in the incident closed state until it has been fully transitioned from the Open state.

Incidents in the closed state have several events that can occur to them

Incident reopen request initiated by customer.

Support case associated with an incident is re-opened.

Feedback received.

Data archive date reached

FIG. 6 depicts the closed state.

Incident Type Specific Deviations from Fault

System-Profile

System-Profile incidents are never in the closed state.

Audit

Audit incidents are never in the closed state.

Connectivity

Connectivity incidents are never in the closed state.

Additional-Data

Additional-Data incidents are treated as operations on a pre-existing incident once they reach the server. They have activities performed that could be considered part of the In-Progress state, but these incidents lifecycle do not maintain a separate existence from the pre-existing incident from which they were submitted.

System-Assessment

System-Assessment incidents leave the In Progress state and go directly to the closed state after data storage, entitlement and notification. System-Assessment incidents are not archived 12 months.

Event—Reopen Incident Requested

Incidents can be reopened if they have not been archived. This event can come from two places:

Customer requests through customer support portal.

Associated support case is re-opened.

Once an incident has been archived, it is not capable of being reopened.

Activity—Reopen Incident

There are effects on multiple systems when an incident is reopened.

Self-Healing Server

The Self-Healing Server accepts requests from the customer support portal or accepts the support case reopen request and generates an incident reopen request and checks the status on the incident. If the incident is not archived, the self-healing server updates the status on the incident, republishes the incident as opened and generates a notification to the customer.

Customer Support Portal (eCare)

The customer support portal accepts the request, updates its incident data repository and ensures transmission of the request to the self-healing server.

The customer support portal also accepts an update to the incident's data once the self-healing server fully processes the request.

Event—Support Case Re-opened

Support cases can be re-opened at customer request, but this is not encouraged and is rare. It also can only be done if the case has not been archived (archival is dependent upon the support case management provider rules). A new support case can be opened referring to a prior support case, but this is done only through the support case notes and does not generate any explicit events.

When a support case is re-opened, the incident will also be re-opened if it has not already been archived.

Activity—Re-open Support Case

There are effects on multiple systems when a support case is re-opened. The effects are described below.

Support Case Management Provider

The case is re-opened if the case has not been archived. For HP, this has effects on HP Services WFM and SGBU Case Manager.

Vendor Services WFM

The case is re-opened if the case has not been archived. WFM will notify SGBU Case Manager that the case has been re-opened.

SGBU Case Manager

SGBU Case Manager should be notified and the status of the case will change. If the customer views their case in the eCare Case Manager view, then the new status should be shown and they will be able to edit the case as normal. SGBU Case Manager notifies the self-healing server of the re-opening.

Self-Healing Server

See reopen incident activity.

Event—Data Archival

Fault Incidents may be automatically archived if the incident is already in the closed state and there has been no activity on the incident in 90 days.

Activity—Archive Incident

There are effects on multiple systems when an incident is archived. The effects are described in the lifecycle state of Archived.

Lifecycle State—Archived

Once an incident reaches the Archived state, then it cannot be directly re-opened by the customer. Fault incidents are moved to the state of archived once an archival event is received.

Incident Type Specific Deviations from Fault

System-Profile

System-Profile incidents leave the In Progress state after data storage and go directly to Archived.

Audit

Audit incidents leave the In Progress state after data storage and go directly to Archived.

Connectivity

Connectivity incidents leave the In Progress state after data storage, entitlement and notification and go directly to Archived.

Additional-Data

Additional-Data incidents are treated as operations on a pre-existing incident once they reach the server. They have activities performed that could be considered part of the In-Progress state, but these incidents lifecycle do not maintain a separate existence from the pre-existing incident from which they were submitted.

13.1.5 System-Assessment

System-Assessment incidents leave the In Progress state and go directly to the closed state after data storage, entitlement and notification. System-Assessment incidents are set to archived after 12 months.

Data Retention Policies

Customer System

Data retention on the customer system will be controlled manually by the customer.

Customer Support Portal (eCare)

The Self-Healing server will track the length of time that an incident is closed and will coordinate unpublishing of the incident data once the archive date is reached. This will be done after 90 days of no activity.

Self-Healing Server

The data stored in the database is later used for analysis engine input and metric reporting. There currently are not any policies defined for the length of time that data is retained. This will be refined as the analysis engine requirements are developed.

Support Case Management Provider

A vendor can have two systems that act as a support case management provider.

SGBU Case Manager

Support cases are retained and moved to a data warehouse according the SGBU eBusiness IT policies. There currently is not a policy, but the SGBU eBusiness IT is considering their future direction. The current most likely scenario is that cases will be archived (and therefore no longer visible) after 12 months.

Vendor Services WFM

Support cases are retained and moved to a data warehouse according the HP Services policies. Currently this is set at 12 months after closure but this time will decrease as the WFM database continues to grow and expectations are that this will be reduced to 3 months or less over time.

Server Collection Provider

The server collection provider for the server receives a deletion request from the self-healing server at archival time. Whether or not the collection provider implements the deletion request is up to the specific provider.

Vendor's ISEE

Self healing sends configuration data through the ISEE system. The resulting ISEE incident data is not managed as an ISEE incident. Therefore, it is never 'opened' as an ISEE incident and has no ISEE managed WF. The lifecycle is very short. Once processed into the configDB they are basically closed and the data is accessible only via the configDB, DAL or CEUI.

For the incidentDB, ISEE purges closed incidents and config data older than 6 months. We allow our partners to identify aging policies for their configuration data in the configDB. SGBU currently has a 6 month aging policy for their collections.

ISEE WFM cases are handled entirely within the Clarify system. Once the WF case is closed, the corresponding ISEE incident is closed as well (within 24 hours via a one-day polling process). ISEE is only aware of WF cases created through its own processes (automated or manual). The ISEE UI's ignores cases created via partner apps or external manual submissions.

The present invention provides for many alternatives to the illustrated embodiments. For example, the states assigned to fault incidents as they are handled can be changed and the opportunities for a customer to affect the states and handling of fault incidents can be varied. Also, incidents other than faults can be handled and opportunities given for customer to affect their handling. These and other variations upon and modifications to the illustrated embodiments are provided for by the present invention, the scope of which is defined by the following claims.

What is claimed is:

1. A computer support network comprising:
   a vendor service computer system for receiving and analyzing data relating to support incidents, said service computer system providing solutions to a customer to address said incidents, said vendor service computer system assigning states to an incident as it is being handled, said vendor service computer system automatically advancing the state of an incident from an open state during which a customer can request help from vendor support personnel and a closed state during which a customer cannot request help from vendor support personnel, said vendor service computer system having an incident data base indicating said state; and
   a customer system running service software for:
      automatically detecting a fault when it occurs on said customer system,
      gathering data concerning said fault, and
      communicating said data to said vendor system,
   said service software providing a portal providing for said customer to
      monitor the state of an incident being handled by said vendor service computer system, and
      reset the state of an incident in said closed state indicated in said incident database to open an open state.

2. A computer support network as recited in claim 1 wherein, absent intervention by said customer, no further analysis is performed by said vendor system on an incident in said closed state, said vendor system performing further analysis on said incident while said incident is in said open state.

3. A computer support network as recited in claim 1 wherein said service software assigns an incident identifier to said fault after said detecting and before said communication.

4. A method comprising:
   running service software on a customer computer;
   said service software detecting a fault on said customer computer;
   said service software assigning an incident identifier to said fault;
   said service software gathering diagnostic data concerning said fault;
   said service software communicating said diagnostic data to a vendor service computer system;
   said vendor service computer system analyzing said diagnostic data, generating a solution, and informing a customer of said solution;
   said vendor service system assigning an open state to said incident identifier and indicating said open state in an incident database;
   said vendor service system automatically advancing to a closed state and indicating said closed state in said incident database;
   a customer restoring said open state as indicated in said incident database via a portal provided by said service software;
   said customer requesting support from vendor support personnel while said incident is in said open state; and
   said customer, while said incident database indicates said incident is in said open state, contacting vendor support personnel.

* * * * *